H. AULT & C. SWITALSKI.
AUTOMATIC WEIGHING SCOOP.
APPLICATION FILED MAR. 11, 1911.
1,016,246.
Patented Feb. 6, 1912.
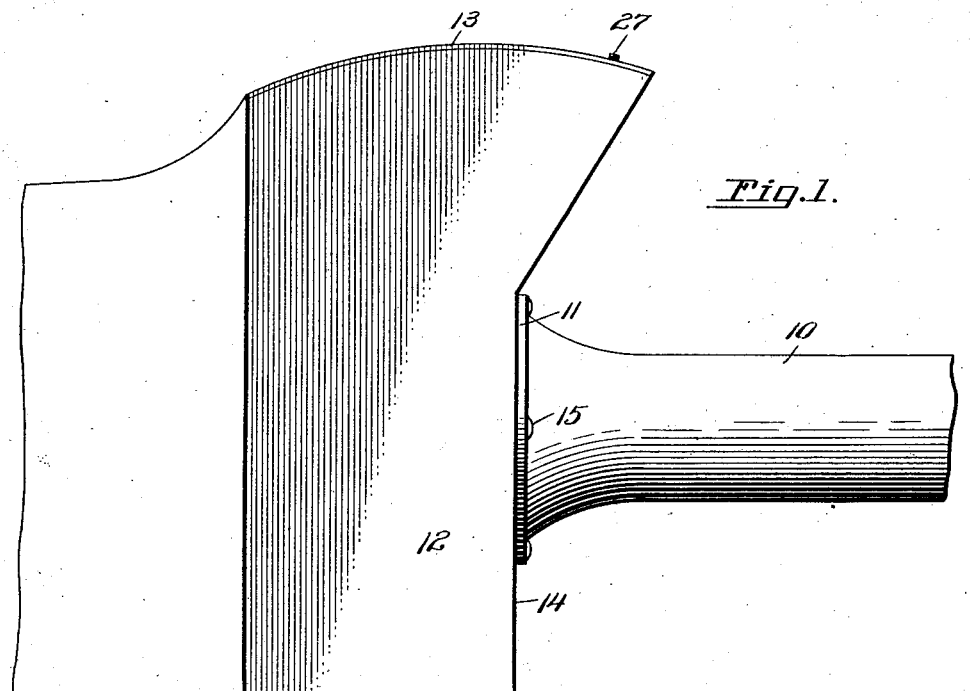
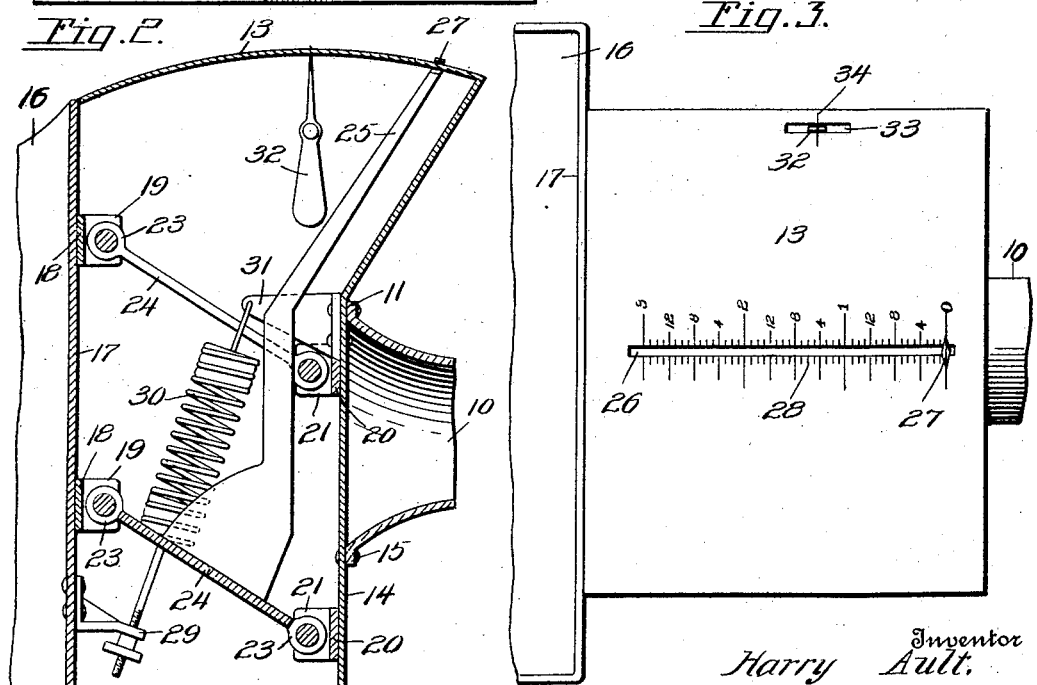
Inventor
Harry Ault.
Clemens Switalski
By Victor J. Evans
Attorney
Witnesses

UNITED STATES PATENT OFFICE.

HARRY AULT AND CLEMENS SWITALSKI, OF PORTSMOUTH, OHIO.

AUTOMATIC WEIGHING-SCOOP.

1,016,246.  Specification of Letters Patent.  Patented Feb. 6, 1912.

Application filed March 11, 1911. Serial No. 613,937.

*To all whom it may concern:*

Be it known that we, HARRY AULT and CLEMENS SWITALSKI, citizens of the United States, residing at Portsmouth, in the county of Scioto and State of Ohio, have invented new and useful Improvements in Automatic Weighing-Scoops, of which the following is a specification.

The invention relates to scoops and more particularly to the class of automatic weighing scoops.

The primary object of the invention is the provision of a scoop in which the weight of its contents may be accurately determined without requiring such contents to be weighed by the dumping thereof on to a scale.

Another object of the invention is the provision of a scoop in which the weight of the material held therein may be accurately determined so as to enable a person to know the exact weight of the said material by pounds or fractions thereof, thus obviating the necessity of determining the weight of said material after the same has been discharged from the scoop thereby saving considerable time and labor to the user of the scoop.

A further object of the invention is the provision of a scoop, which is simple in construction, thoroughly reliable and efficient in operation and inexpensive in manufacture.

With these and other objects in view the invention consists in the construction, combination and arrangement of parts as will be hereinafter more fully described, illustrated in the accompanying drawings and pointed out in the claims hereunto appended.

In the drawings, Figure 1 is a fragmentary side elevation of a scoop constructed in accordance with the invention. Fig. 2 is a vertical longitudinal sectional view thereof. Fig. 3 is a fragmentary top plan view.

Similar reference characters indicate corresponding parts throughout the several views of the drawings.

Referring to the drawings by numerals, the scoop comprises a handle 10 having formed at one end a circular head flange 11 to which is fixed a shell or casing comprising side walls 12, an upwardly bowed or arcuate shape top 13 and a rear wall 14 the circular head flange 11 of the handle being secured to said rear wall 14 against the outer face thereof by means of rivets 15 thereby securing the shell or casing to the handle. Movably connected to the rear wall 14 of the casing or shell is a scoop body 16 the same being of the ordinary well-known construction and has secured to its rear wall 17 exteriorly thereof spaced upper and lower bearings 18 the same being formed at or near opposite ends with out-turned bearing ears 19 and likewise secured to the rear wall 14 of the shell or casing are similar brackets 20 having out-turned bearing ears 21. The ears 19 and 21 respectively have detachably engaged therewith pivot pintles 22 the same being also passed through eye extensions 23 formed on swinging links 24 disposed within the shell or casing and interposed between the rear wall of the latter and the scoop body 16 thus permitting the same to swing toward and away from the said shell or casing for a purpose as will be hereinafter more fully described.

Fixed to the lowermost swinging link 24 is one end of a scale hand 25 the latter being adapted to be moved in an arc and has its free end portion working within an elongated slot 26 formed in the top wall 13 of the shell or casing the free end portion of the said scale hand 25 being provided with a pointer terminal 27 disposed externally of the shell or casing and is adapted to traverse the graduated scale 28 marked on the outer face of the top wall of said casing contiguous to the slot 26 therein and co-extensive with the same so upon movement of the scoop body 16 the scale hand 25 will be shifted simultaneously therewith and its pointer 27 will move over the scale 28 on the shell or casing the scale 28 being divided into pounds or fractional degrees thereof, thus enabling a person to determine the weight of the contents of the scoop body when the latter is held within the hand of a person. The scoop body 16 has fixed thereto on its rear wall an ear 29 in which is adjustably engaged one end of a retractile spring 30 the same being connected at its opposite end to an ear 31 fixed to the rear wall of the casing or shell the spring 30 being adapted to tension the scale body and is expanded when material is held therein for the weighing of the latter.

Pivoted within the shell or casing to one side wall thereof is a weighted level indicating hand or pointer 32 the latter working through a suitable slot 33 provided in the top wall of the said shell or casing and adjacent to this slot is provided an arrow 34 so when the pointer 32 alines therewith it will enable the user of the scoop to determine that the same is on a level while being held within the hand.

From the foregoing it is thought that the construction and operation of the invention will be clearly apparent and therefore a more extended explanation has been omitted.

What is claimed is:

1. In a scoop of the class described, a scoop body having spaced alining lugs on the rear end thereof in normal alinement with the said scoop body, a casing fixed to the handle and normally abutting against the rear end of the scoop body, links pivotally connected with the lugs and the said casing, brackets fixed to the scoop and casing, respectively, a spring fixedly connected to one bracket and adjustably connected to the other bracket, a scale formed on the casing, and a pointer hand fixed to one link and projecting exteriorly of the casing to coöperate with the scale when traversing the same on the lowering of the scoop body.

2. In a scoop of the class described, a scoop body having spaced alining lugs on the rear end thereof in normal alinement with the said scoop body, a casing fixed to the handle and normally abutting against the rear end of the scoop body, links pivotally connected with the lugs and the said casing, brackets fixed to the scoop and casing, respectively, a spring fixedly connected to one bracket and adjustably connected to the other bracket, a scale formed on the casing, a pointer hand fixed to one link and projecting exteriorly of the casing to coöperate with the scale when traversing the same on the lowering of the scoop body, and a weighted pointer pivoted to one side wall of the casing and adapted to be maintained perpendicular irrespective of the angle of incidence of the casing.

3. In a scoop of the class described, a scoop body having spaced alining lugs on the rear end thereof in normal alinement with the said scoop body, a casing fixed to the handle and normally abutting against the rear end of the scoop body, links pivotally connected with the lugs and the said casing, brackets fixed to the scoop and casing, respectively, a spring fixedly connected to one bracket and adjustably connected to the other bracket, a scale formed on the casing, a pointer hand fixed to one link and projecting exteriorly of the casing to coöperate with the scale when traversing the same on the lowering of the scoop body, a weighted pointer pivoted to one side wall of the casing and adapted to be maintained perpendicular irrespective of the angle of incidence of the casing, and means for limiting the swinging movement of said body.

4. The combination with a scoop body, of a casing normally abutting against the rear wall of the said body and having a longitudinal slot in its top, a handle fixed to the casing at the rear thereof, links pivotally connected with the rear wall of the scoop body and the said casing, a pointer fixed to one link and traversible in said slot in the casing, and expansion means arranged within the casing and connected with the latter and the scoop body, whereby said body will be normally maintained in contact with the said casing and in alinement with the handle.

5. The combination with a scoop body, of a casing normally abutting against the rear wall of the said body and having a longitudinal slot in its top, a handle fixed to the casing at the rear thereof, links pivotally connected with the rear wall of the scoop body and the said casing, a pointer fixed to one link and traversible in said slot in the casing, expansion means arranged within the casing and connected with the latter and the scoop body, whereby said body will be normally maintained in contact with the said casing and in alinement with the handle, and means for adjusting the expansion means.

6. The combination with a scoop body, of a casing normally abutting against the rear wall of the said body and having a longitudinal slot in its top, a handle fixed to the casing at the rear thereof, links pivotally connected with the rear wall of the scoop body and the said casing, a pointer fixed to one link and traversible in said slot in the casing, expansion means arranged within the casing and connected with the latter and the scoop body, whereby said body will be normally maintained in contact with the said casing and in alinement with the handle, means for adjusting the expansion means, and a leveling device connected with the casing.

In testimony whereof we affix our signatures in presence of two witnesses.

HARRY AULT.
CLEMENS SWITALSKI.

Witnesses:
L. H. SIELING,
THOMAS BRAND.

Copies of this patent may be obtained for five cents each, by addressing the "Commissioner of Patents, Washington, D. C."